United States Patent [19]
Pennock et al.

[11] Patent Number: 5,140,946
[45] Date of Patent: Aug. 25, 1992

[54] ILLUMINATED PET COLLAR

[76] Inventors: Joseph F. Pennock; Kenneth M. Pennock, both of 3149 Meyers Dr., Sarasota, Fla. 34239

[21] Appl. No.: 782,979

[22] Filed: Oct. 24, 1991

Related U.S. Application Data

[63] Continuation-in-part of Ser. No. 607,257, Oct. 31, 1990, Pat. No. 5,074,251.

[51] Int. Cl.⁵ ............................................. A01K 27/00
[52] U.S. Cl. ..................................... 119/106; 362/108
[58] Field of Search ................ 119/106, 109; 352/103, 362/104, 108, 222, 223, 249

[56] References Cited

U.S. PATENT DOCUMENTS

| | | | |
|---|---|---|---|
| 3,641,333 | 2/1972 | Gendron | 362/108 |
| 4,173,201 | 11/1979 | Chao et al. | 119/106 |
| 4,887,552 | 12/1989 | Hayden | 119/109 |
| 4,909,189 | 3/1990 | Minotti | 119/106 |
| 5,046,456 | 9/1991 | Heyman et al. | 119/106 |

Primary Examiner—Robert P. Swiatek
Assistant Examiner—Todd E. Manahan
Attorney, Agent, or Firm—Charles J. Prescott

[57] ABSTRACT

An illuminable pet collar including a housing for a battery power source and an elongated, flexible, pliable, transparent plastic display tube having a plurality of spaced apart miniature lights operably connected therewithin and along substantially the entire length of the display tube. The housing includes a stem or extension tube extending from each end thereof sized to be snugly inserted into each end of the display tube. Electrical connection between the battery and the outer surface of one stem communicates electrical power to the lights which are parallel-wired within the display tube.

3 Claims, 2 Drawing Sheets

ILLUMINATED PET COLLAR

This application is a continuation-in-part of U.S. patent application Ser. No. 07/607,257 filed Oct. 31, 1990, now U.S. Pat. No. 5,074,251.

BACKGROUND OF THE INVENTION

This invention relates generally to illuminated pet collars, and more particularly to a pet collar which includes a removable transparent tube into which a plurality of lights are operably connected for viewing.

A number of illuminated pet collars are known in prior art. One such device is disclosed in U.S. Pat. No. 4,173,201 to Chao which is directed to a collar having a row of small electric lamps studded around the collar. Another prior art device known to applicant is disclosed in U.S. Pat. No. 4,895,110 to LoCascio. This invention is directed to a collar having a light source and a power source along a strap member, the electrical circuitry being completed only when the strap member is engaged around the pet's neck.

Yet another invention known to applicant is disclosed in U.S. Pat. No. 4,909,189 to Minotti which is directed to an illuminated pet collar having a self-fastening strip of material which includes a reflective strip or lights.

An electrically lighted leash is also disclosed in U.S. Pat. No. 4,887,552 to Hayden, the entire length of the leash and collar-forming end thereof having small electric lights disposed therealong.

Two additional references are also known to applicant which are not directed to animal collars, but rather belts for surrounding the waist area of the human anatomy. One such device is disclosed in U.S. Pat. No. 4,652,981 to Glynn, the other disclosed in U.S. Pat. No. 3,641,333 to Gendron. The Gendron reference is somewhat similar to the present invention except that it includes a different buckling structure and depends upon a magnetic interconnection to both retain and form the electrical connection for lighting the device.

The present invention provides an illuminated pet collar formed primarily of a removable elongated transparent tubular member into which a plurality of spaced apart miniature lights are disposed there along. The invention provides for detachment of this tubular light carrying member and for the convenient shortening of its length to accommodate a broad pet size range and for its replacement.

BRIEF SUMMARY OF THE INVENTION

This invention is directed to an illuminable pet collar including a housing for a battery power source and an elongated, flexible, pliable, transparent plastic display tube having a plurality of spaced apart miniature lights operably connected therewithin and along substantially the entire length of the display tube. The housing includes a stem or extension tube extending from each end thereof sized to be snugly inserted into each end of the display tube. Electrical connection between the battery and the outer surface of one stem communicates electrical power to the lights which are parallel-wired within the display tube.

It is therefore an object of this invention to provide an illuminated pet collar formed of a smooth, transparent tubular member having a plurality of spaced miniature lights operably disposed therewithin and there along.

It is yet another object of this invention to provide an illuminated pet collar which fully conceals and protects the miniature lights from contact with the pet.

It is yet another object of this invention to provide for interchangeable ornamental miniature light carrying tubular members of an illuminated pet collar to achieve a broad range of ornamental distinctiveness.

In accordance with these and other objects which will become apparent hereinafter, the instant invention will now be described with reference to the accompanying drawings.

DETAILED DESCRIPTION OF THE INVENTION

Figure 1:
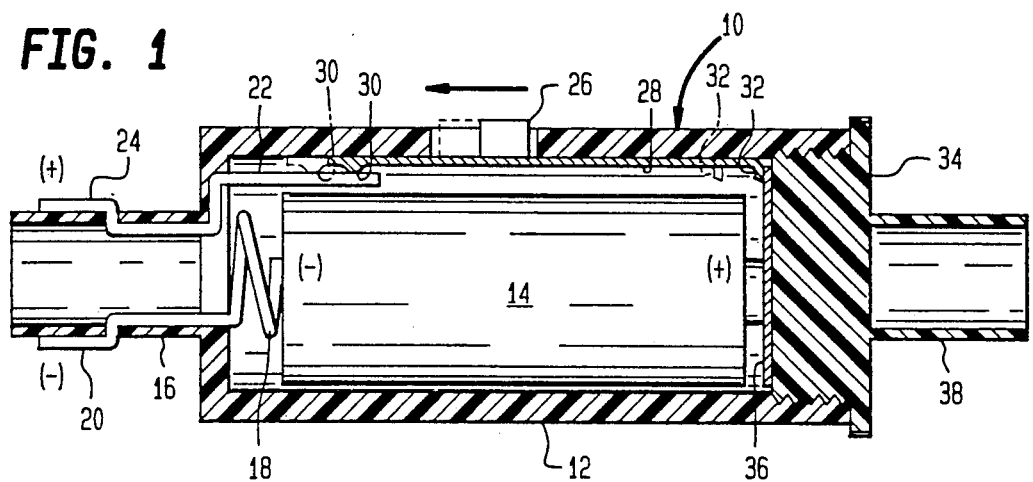
FIG. 1 is a longitudinal section view of the battery housing of the present invention.

Referring now to the drawings, the present invention includes a battery housing 10 shown in FIG. 1 and a tube assembly 40 having an elongated, flexible, pliable, thin-wall plastic transparent length of tubing 58 and a plurality of miniature lights 42 mounted in sockets 44 disposed in spaced apart fashion therewithin. The battery housing 10 includes a main housing portion 12 having a hollow interior surface structured to receive a conventional battery power source 14 therein. A stem 16 integral with main housing portion 12 extends longitudinally from the left end thereof as shown.

This stem 16 includes two electrical contacts 22 and 24 disposed on the exterior surface thereof in electrical isolation and opposition one to another. Electrical contact 20 is integral with a coil spring contact 18 which makes electrical contact with the ground or negative (−) end of battery 14. Electrical contact 24 extends into the interior of main housing portion 12 in electrical isolation from spring 18 and extends at 22 along a portion of the length of the interior of housing portion 12 as shown.

The battery housing 10 also includes a threadably removable end plug 34 having its own longitudinally extending stem 38. End plug 34 also includes metal contact plate 36 connected on the inner end surface which engages against the positive (+) output terminal of battery 14 as shown. Contact plate 36 laterally extends to make electrical contact with one end 32 of a metal slide contact 28. Slide contact 28 is connected to switch 24 which is movable within main housing portion 12 in the direction of the arrow within a mating slot in main housing portion 12. Slide contact 28 includes a dimple or protrusion 30 which is in continual biased contact against contact portion 22. Thus, when slide contact 28 is in the position shown in solid lines, a completed circuit is made between the positive (+) output of battery 14 and contact 24. Likewise, when switch 26 is moved in the direction of the arrow, end 32 (in phantom) is disconnected from contact plate 36 and this electrical circuit is broken.

Stems 16 and 38 are sized so as to snugly slidably fit into the ends of transparent tube 58. One end of transparent tube 58 includes arcuate electrical contacts 54 and 56 which are sized so as to make electrical contact with contact terminals 20 and 24 on stem 16. Suitable lengths of flexible wire conduits 50 and 52 then extend along substantially the entire length of transparent tube 58. Each bulb socket 44 is electrically connected to the two wire conduits 50 and 52 by jumpers shown typically at 46 and 48.

By this arrangement, then, when the end of transparent tube 58 which carries contacts 54 and 56 is slidably engaged over stem 16, a completed electrical circuit is made between contacts 20 and 24 and all of the miniature bulbs 42 contained within and extending along the interior surface of transparent tube 58. Thus, even without the other end of transparent tube 58 being connected onto stem 38, the miniature lights 42 may be activated by the appropriate positioning of switch 26.

The present invention also provides for the quick and easy shortening in length of transparent tube 58 by severing or cutting therethrough along any desired transection point shown typically at either A or B. The end portion 60 of transparent tube 58 beyond transection line A is provided without miniature lights 42 or electrical conduits 50 and 52 contained therein to facilitate minor shortening. However, should more substantially shortening of transparent tube 40 be desired such as through transection line B, the miniature lights 42 and circuitry contained within the remaining major portion of transparent tube 58 are left fully intact and operable without additional wiring repair required because the entire circuitry is parallel or "lap" wired.

The present invention provides for an additional benefit in that the user may separately purchase tubular lighting assemblies 40 of various transparent colors and different colored miniature bulbs 42. Likewise, should one or more of the miniature bulbs 42 burn out, the tubular lighting assembly 40 may be easily replaced without the need for purchasing an additional battery housing 10.

Figure 4:
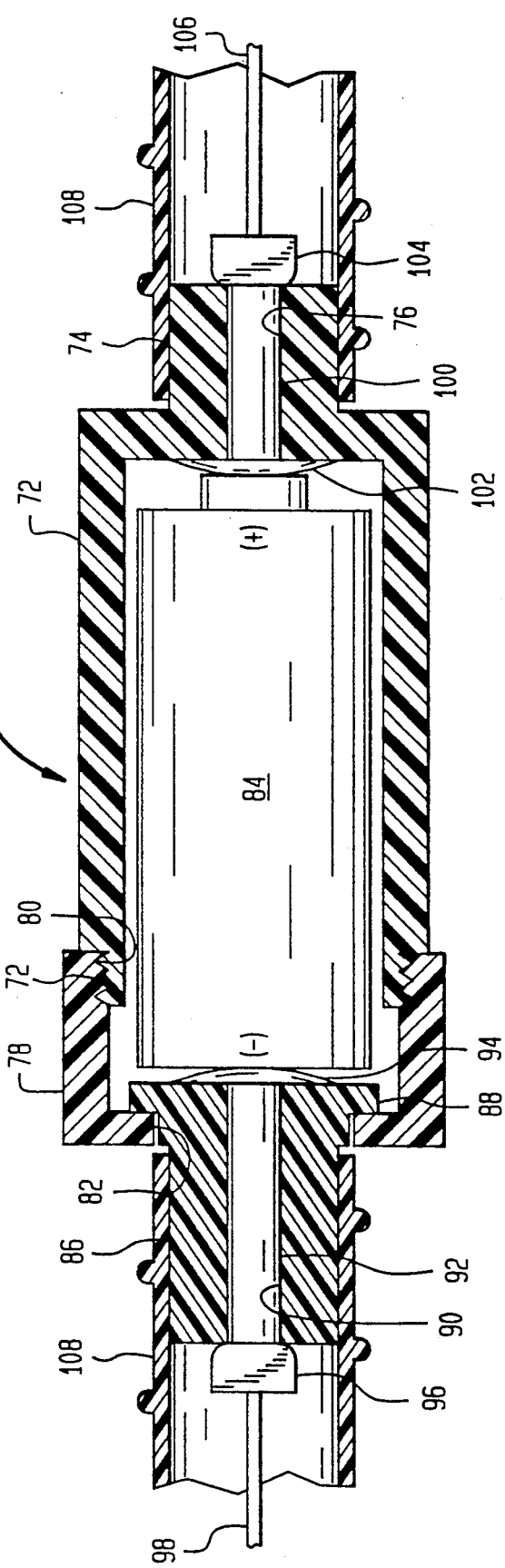
FIG. 4 is a longitudinal section view of the battery housing of another embodiment of the invention.

Referring lastly to FIG. 4, an alternate embodiment of the invention is shown generally at numeral 70 and includes battery housing comprised of two housing halves 72 and 78 which are threadably engagable one to another by mating thread surfaces 72 and 80 to house a battery 84. Housing portion 72 includes an integral coaxial cylindrical stem 74, while housing portion 78 entraps and retains a coaxial cylindrical stem 76 which passes through hole 82 and is held in place by flanges 88 as shown.

Each stem 74 and 86 includes a specially formed electrical contact 100 and 92, respectively. These electrical contacts 100 and 92 each includes a large battery contact head 102 and 94, respectively, and have their main cylindrical shafts slidably engaged through longitudinal holes 76 and 90, respectively. Each electrical contact 100 and 92 is staked in position within holes 76 and 90, respectively by flattening their distal ends at 104 and 96, respectively.

Figure 3:
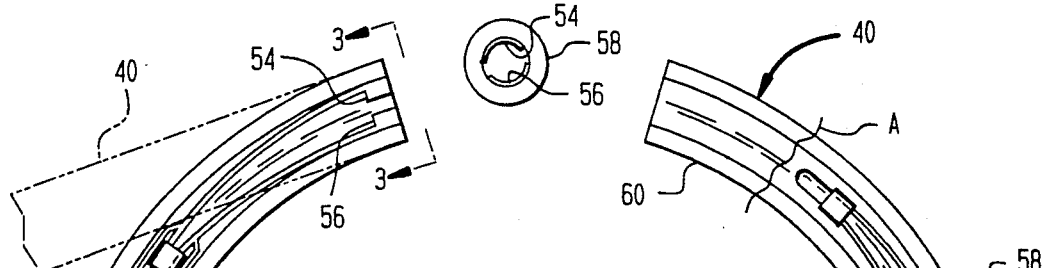
FIG. 3 is a view in the direction of arrows 3—3 in FIG. 2.
Figure 2:
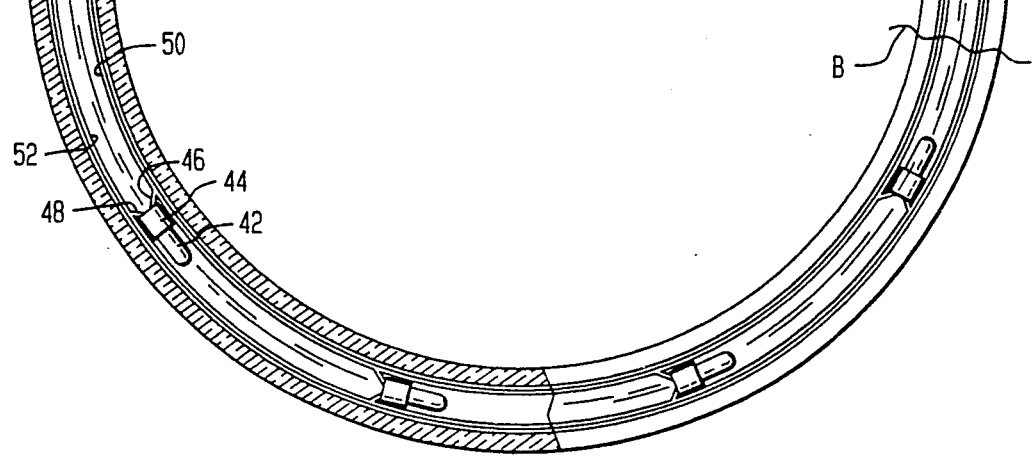
FIG. 2 is a side elevation partially broken view of the transparent flexible plastic tubular member of the present invention.

Two flexible wire conduits 106 and 98 are soldered to the staked distal ends 104 and 96, respectively, and are paralleled wired within transparent, ribbed flexible tube 108 to a plurality of miniature lights similar to that previously described in FIG. 3. However, in this embodiment 70, each flexible conduit 106 and 98 needs only to extend to the last light at the opposite end within the flexible tube 108, the conduits 106 and 98 being parallel connected to each miniature light therealong.

This embodiment 70, as may be now appreciated, does not require a separate switch for energizing the miniature lights, but is rather activated whenever the housing halves 72 and 78 are screwed together sufficiently so that the terminals of battery 84 each make contact with enlarged contact heads 94 and 102. The embodiment 70 may alternately be constructed such that each housing half is essentially identical in length, except for the male/female threadable engagement and wherein both cylindrical stems are integrally formed similar to stem 74 with respect to housing portion 72.

While the instant invention has been shown and described herein in what are conceived to be the most practical and preferred embodiments, it is recognized that departures may be made therefrom within the scope of the invention, which is therefore not to be limited to the details disclosed herein, but is to be afforded the full scope of the claims so as to embrace any and all equivalent apparatus and articles.

What is claimed is:

1. An illuminated collar for pets comprising:
   an elongated flexible, pliable, thin wall, transparent plastic display tube open at each end;
   two spaced apart flexible electrical conduits electrically isolated one from another and generally coextensive with and within said tube;
   a plurality of spaced apart miniature lights electrically connected in parallel between said two electrical conduits and extending within and along substantially the entire length of said tube;
   a small housing having connectably mating housing halves for removably retaining a battery power source therewithin and having a cylindrical stem axially extending from each end of said housing;
   each said stem having an electrical contact extending therethrough in electrical communication between one end of said battery source and one said electrical conduit;
   each end of said tube sized for snug slidable engagement over one said stem forming said collar with said housing;
   said plurality of lights electrically being connected to said battery when said housing halves are fully connected one to another.

2. An illuminated collar for pets as set forth in claim 1, wherein:
   said tube is decoratively colored.

3. An illuminated collar for pets as set forth in claim 1, wherein:
   said tube is permanently secured over one said stem.

* * * * *

UNITED STATES PATENT AND TRADEMARK OFFICE
CERTIFICATE OF CORRECTION

PATENT NO. : 5,140,946

DATED : August 25, 1992

INVENTOR(S) : Joseph F. Pennock and Kenneth M. Pennock

It is certified that error appears in the above-identified patent and that said Letters Patent is hereby corrected as shown below:

On the Title page, item [57]
In the Abstract, line 6, after "housing", insert -- is formed of two mating halves and --

In the Abstract, line 8, delete "Electrical connection between the battery and the outer surface of one stem communicates electrical power" and insert -- An electrical contact extends through each stem and electrically connects the battery power source -- therefor.

Column 4, line 47, after "stem", insert -- thereby --.

Column 4, line 49, delete "electrically being" and insert -- being electrically -- therefor.

Signed and Sealed this

Twenty-eighth Day of September, 1993

Attest:

BRUCE LEHMAN

Attesting Officer

Commissioner of Patents and Trademarks